UNITED STATES PATENT OFFICE.

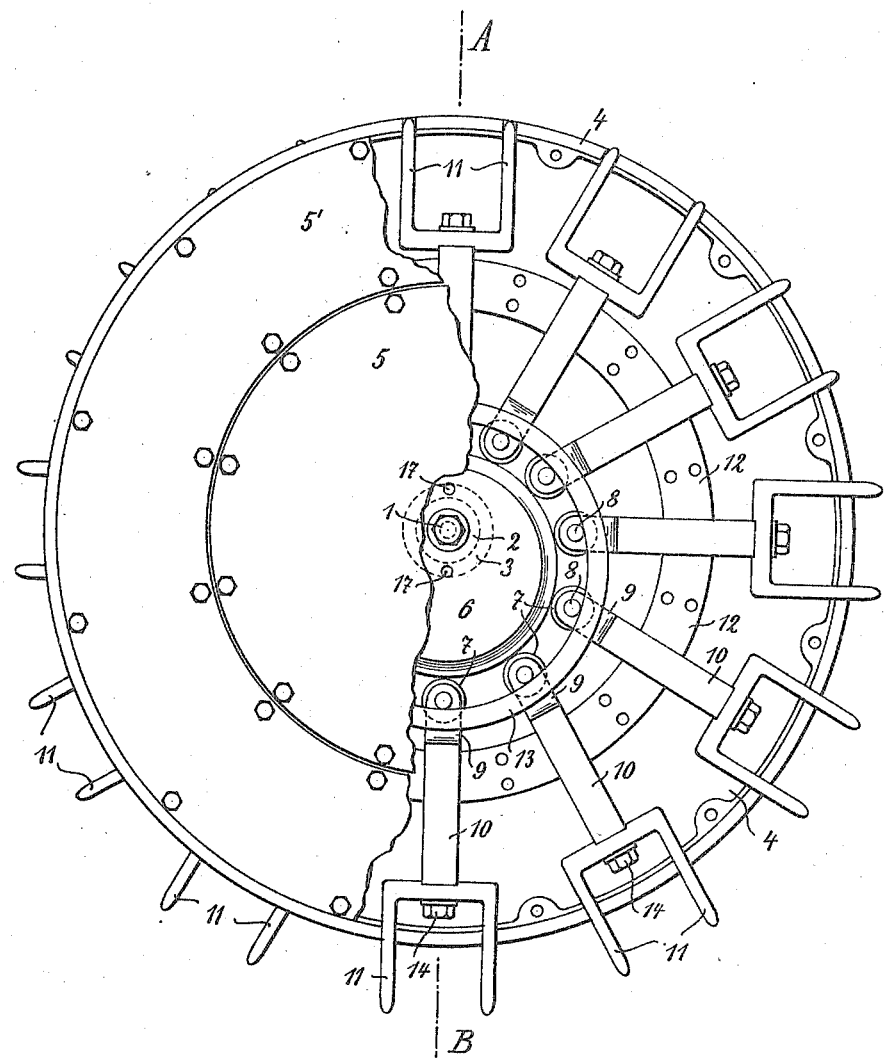

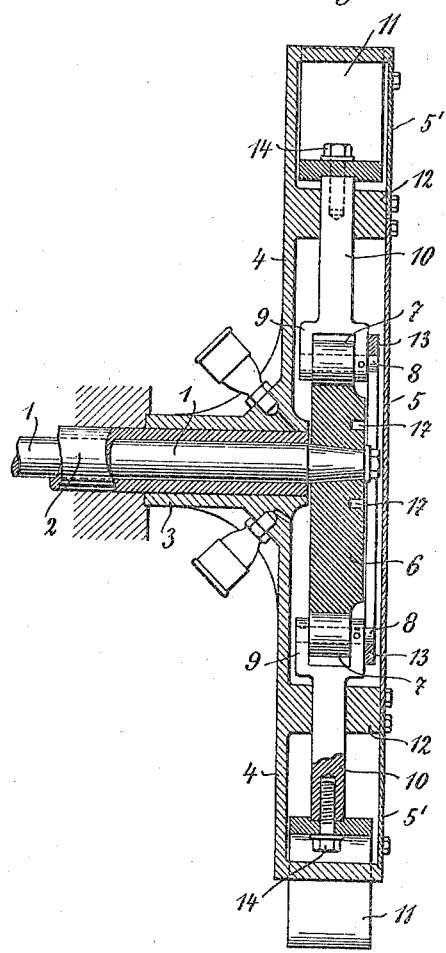
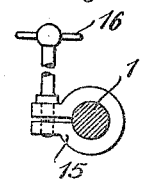

HENRY HALLAM, OF PARIS, FRANCE.

DRIVING-WHEEL FOR MECHANICAL TRACTORS.

1,284,098.     Specification of Letters Patent.     Patented Nov. 5, 1918.

Application filed May 15, 1916. Serial No. 97,635.

*To all whom it may concern:*

Be it known that I, HENRY HALLAM, a subject of the King of Great Britain and Ireland, residing at No. 31 Rue de Lisbonne, Paris, France, have invented certain new and useful Improvements in Driving-Wheels for Mechanical Tractors, of which the following is a specification.

This invention has for its object to provide an improved driving wheel more particularly adapted for tractor vehicles (hereinafter referred to as "tractors") which are intended for use in connection with crops sown or grown in rows, the distance between the rows being such as to leave only a very narrow track for the said tractors, thereby also rendering it necessary to limit to a minimum the width of the rim of the driving wheels.

The improved means for assuring the adhesion of the wheel to the ground is also designed so as to allow of increasing more or less the depth of penetration of the teeth in the ground according to the nature of the soil under cultivation.

This invention will now be more particularly described with reference to the accompanying drawings which illustrate by way of example one embodiment of the invention.

In these drawings:

Figure 1 is a side elevation partly in section of the improved wheel.

Fig. 2 is a vertical cross section on the line A—B of Fig. 1; and

Fig. 3 illustrates a detail.

In the example shown, 1 is the axle of the wheel upon which there is mounted a hollow sleeve 2 fixed to the frame of the vehicle. 3 is the hub of the wheel 4; it is mounted to rotate on the sleeve 2. The side of the wheel 4 furthest from the hub is closed by a disk composed of two concentric parts 5 and 5'. 6 is an eccentric keyed on the axle 1. 7 are rollers adapted to roll over the periphery of this eccentric; their axle pins 8 are mounted in the heads 9 of operating rods 10, at the end of which latter the teeth 11 are fixed.

In order to prevent the rollers 7 from leaving the rolling tracks constituted by the eccentric 6, the operating rods 10 are made square in cross section where they pass through a ring 12 that is fixed to the wheel 4.

13 is a ring which surrounds all the axle pins of the rollers and serves to retain the latter upon the periphery of the eccentric 6.

The operating rods 10 are adapted to slide with slight friction in the ring 12. This ring 12 forms with the part 5 of the side disk of the wheel, a tight box which may be filled with grease for lubricating the rollers and the other rubbing parts located therein.

The teeth 11 are connected together in pairs and project through slots formed in the rim of the wheel 4. Each pair is fixed on its operating rod by means of a bolt 14.

For the purpose of changing the teeth, it is merely necessary to remove the part 5' of the side disk, which is screwed on both the ring 12 and the rim of the wheel as shown in Fig. 1.

The greatest depth of penetration of the teeth in the ground is obtained when the eccentricity of the operating mechanism is situated nearest to the ground. In order to diminish the depth of penetration the direction of the eccentricity is altered by means of the mechanism shown in Fig. 3. This mechanism consists of a collar 15 fixed to any suitable point of the frame of the tractor. This collar serves to render the axle 1 stationary and, consequently, to keep in position the eccentric 6 to which it is fixed.

For the purpose of changing the position of the eccentric, first the collar 15 is loosened by means of a key 16 so as to release the axle 1. Then a forked key is inserted in the holes 17 of the eccentric, whereupon the desired change of position can be given to the latter.

To fix the eccentric in its adjusted position, it is merely necessary to tighten up again the collar 15 of the axle 1.

The wheel can be made very easily because it is made in one casting with its bearing surface.

What I claim is:—

1. In a tractor wheel, the combination of a hollow axle, a shaft extending through said hollow axle, a perforated wheel rim concentric to said axle, an eccentric fixed to said shaft inside said wheel rim, a plurality of rollers spaced around and bearing upon the periphery of said eccentric and adapted to roll over said periphery as on a track, a plurality of radiating operating rods in which said rollers are journaled, an annular flange located concentrically to the center of said wheel, formed with holes through which said operating rods pass, and teeth on said operating rods adapted to be thrust through the perforations in the wheel rim into the ground to a depth depending on the adjustment of said eccentric, and a clamping collar encircling said shaft, fixed to the tractor frame, and means such as a screw for tightening said collar upon said shaft for the purpose of fixing said eccentric in its adjusted position.

2. In a tractor wheel the combination of a hollow axle, a shaft extending through said hollow axle, a perforated wheel rim concentric to said axle, an eccentric fixed to said shaft inside said wheel rim, a plurality of rollers spaced around and bearing upon the periphery of said eccentric and adapted to roll over said periphery as on a track, a plurality of radiating operating rods in which said rollers are journaled, an annular flange located concentrically to the center of said wheel, formed with holes through which said operating rods pass, and teeth on said operating rods adapted to be thrust through the perforations in the wheel rim into the ground to a depth depending on the adjustment of said eccentric, said eccentric being formed with holes for the insertion of a forked key by means of which the direction of the eccentricity of said eccentric can be adjusted, and a clamping collar encircling said shaft, fixed to the tractor frame, and means such as a screw for tightening said collar upon said shaft for the purpose of fixing said eccentric in its adjusted position.

3. In a tractor wheel, the combination of a perforated wheel rim, a central adjustable eccentric having its center located in the center of the wheel rim, a plurality of rollers spaced around and bearing upon the periphery of said eccentric and adapted to roll over said periphery as on a track, a plurality of radiating operating rods in which said rollers are journaled, an annular flange located concentrically to the center of said eccentric, formed with holes through which said operating rods pass, and teeth on said operating rods adapted to be thrust through the perforations in the wheel rim into the ground to a depth depending on the adjustment of said eccentric, and a ring encircling the whole series of pivot pins or journals of said rollers whereby the latter are effectually held upon the rolling track of said eccentric.

4. In a tractor wheel having a rim and hub, an eccentric mounted on said hub, ground engaging means for projection and retraction and having inner ends moving on the periphery of said eccentric, and a loose ring maintaining said means in engagement with said eccentric periphery.

In testimony whereof I have signed my name to this specification.

HENRY HALLAM.

Copies of this patent may be obtained for five cents each, by addressing the "Commissioner of Patents, Washington, D. C."